No. 855,409. PATENTED MAY 28, 1907.
C. A. MORRIS.
APPARATUS FOR VENTILATING TUNNELS.
APPLICATION FILED JUNE 20, 1906.
4 SHEETS—SHEET 1.
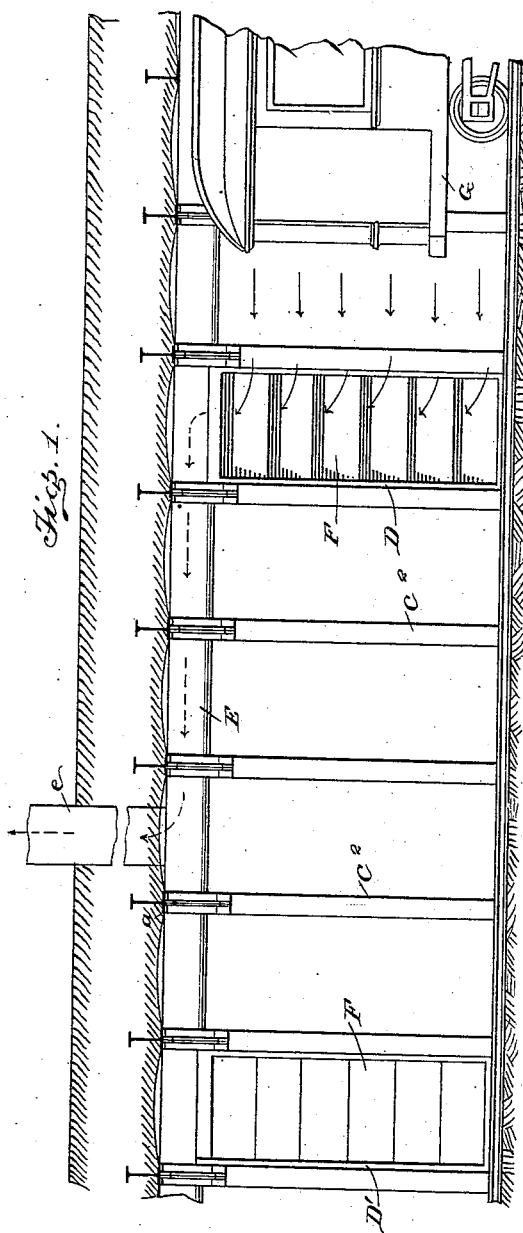
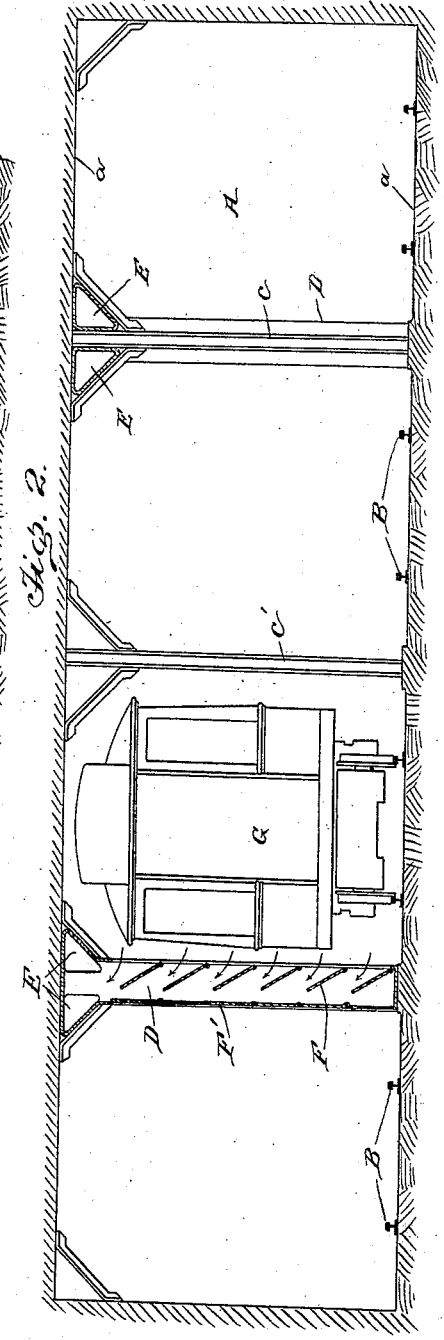
WITNESSES
INVENTOR
Charles A. Morris
BY
Griffens Bernhard
ATTORNEYS

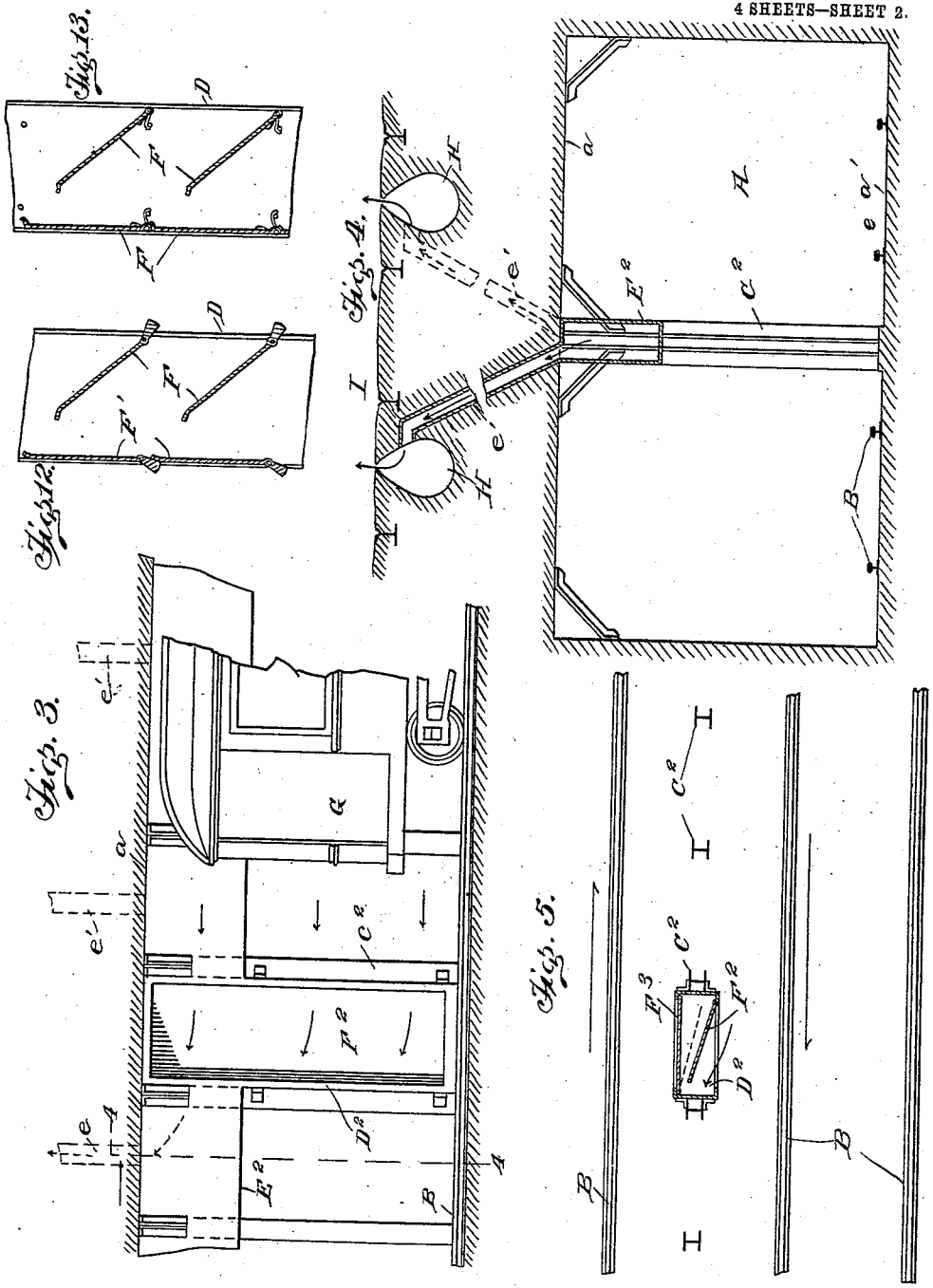

No. 855,409. PATENTED MAY 28, 1907.
C. A. MORRIS.
APPARATUS FOR VENTILATING TUNNELS.
APPLICATION FILED JUNE 20, 1906.
4 SHEETS—SHEET 3.
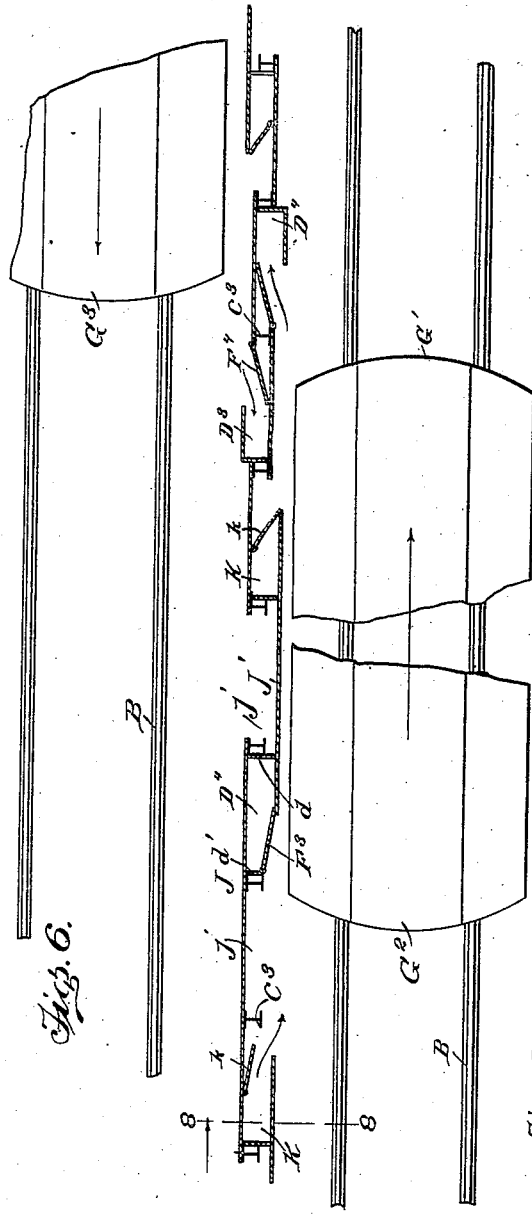
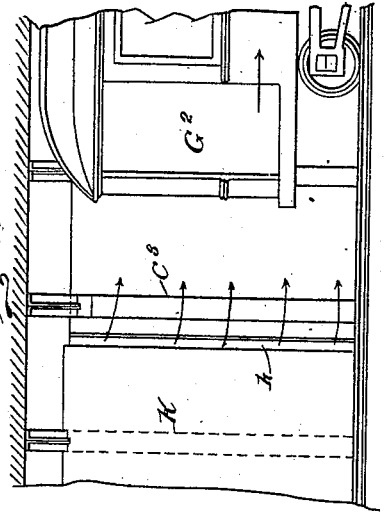
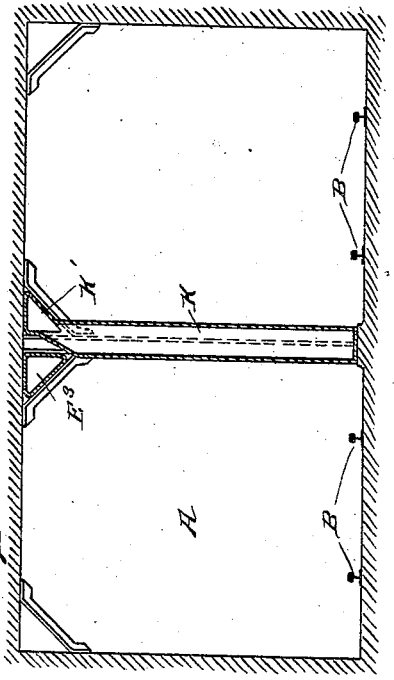
WITNESSES
INVENTOR
Charles A. Morris
BY Griffin & Bernhard
ATTORNEYS

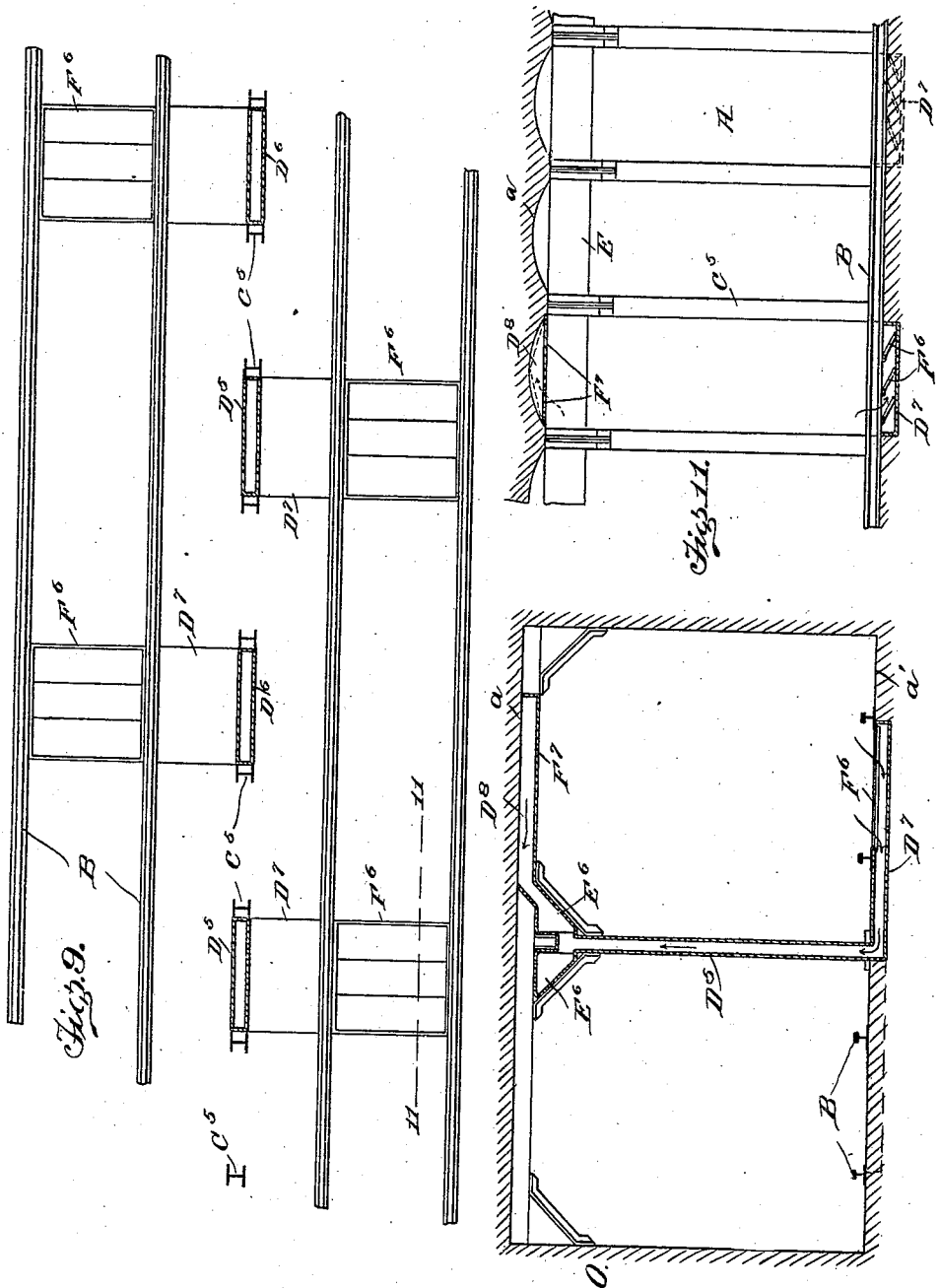

UNITED STATES PATENT OFFICE.

CHARLES A. MORRIS, OF BLOOMFIELD, NEW JERSEY.

APPARATUS FOR VENTILATING TUNNELS.

No. 855,409.          Specification of Letters Patent.          Patented May 28, 1907.

Original application filed July 14, 1905, Serial No. 269,605. Divided and this application filed June 20, 1906. Serial No. 322,584.

*To all whom it may concern:*

Be it known that I, CHARLES A. MORRIS, a citizen of the United States, residing at Bloomfield, in the county of Essex and State of New Jersey, have invented certain new and useful Apparatus for Ventilating Tunnels, of which the following is a specification.

The subject-matter of the present application is a division of a prior application filed by me on the 14th day of July, 1905, Serial No. 269,605, for an invention entitled "Apparatus for ventilating tunnels."

My invention is an apparatus for the ventilation of tunnels and subways, and more particularly for ventilating tunnels in which passenger trains, particularly electrically propelled trains, are operated.

It is well known that the air in tunnels and subways becomes foul and stagnant in the absence of some positive means for securing ventilation. Furthermore, the heat emanating from the motors of electric trains, and from electric illuminating appliances, so elevates the temperature of the air in a tunnel as to make transit therein, particularly in summer, quite objectionable to the traveling public. The admission of fresh air at the passenger entrances and exits, and the motion of trains through the tunnel, do not afford sufficient ventilation for the displacement of the vitiated and heated air.

According to the present invention, the stagnant heated air confined in the tunnel is acted on by the moving trains to create currents which are adapted to find exits through suitable flues or conduits, the latter being independent of the passenger entrances and exits. The air thus displaced by the movement of trains is trapped against returning to the tunnel, such trapped air escaping freely into any suitable place of discharge and into the outer atmosphere.

The displacement of the stagnant air takes place, preferably, in advance of the moving train, which is adapted to have a piston-like action on the confined body of stagnant air. Fresh air is induced to flow into the tunnel through the passenger entrances and exits by the suction due to the movement of the trains, or, if desired, the inflow of fresh air may take place through flues or conduits independent of such exits and entrances.

The flues or conduits, for the exit of foul air, or for the ingress of fresh air, or both, may be constructed in various ways. It is preferred, however, to utilize the columns or pillars, ordinarily employed in tunnel construction, in the erection of such air flues, and to locate said flues at suitable intervals in the length of the tunnel. An important feature of each air flue consists in the employment of a valve or valves, or as they may be designated, louvers, which are normally closed against the passage of stagnant air from the flue back into the tunnel, such valves or louvers being operated, preferably, by the air current or pressure generated by the movement of the train, whereby the stagnant air is caused to flow from the tunnel into the flue. Its return is arrested by the automatic valve or valves, it being allowed to discharge through the flue or flues extending exteriorly of the tunnel.

The flues may have separate points of discharge into the outer atmosphere, or such flues may communicate with, and discharge into, a common conduit running lengthwise of the tunnel, preferably above the same, or the stagnant air may be discharged at any suitable place or places, such discharge taking place through or by any appropriate contrivances or devices.

Different embodiments of the invention are illustrated by the accompanying drawings, wherein Figure 1 is a vertical longitudinal sectional elevation through a portion of the tunnel equipped with my ventilating means and illustrating diagrammatically the operation of a moving train in displacing the stagnant air; Fig. 2 is a vertical cross-section through the tunnel shown by Fig. 1, illustrating a series of four tracks therein, and showing the ventilating devices used in connection therewith; Fig. 3 is a vertical longitudinal section somewhat similar to Fig. 1, and showing another embodiment of the ventilating devices; Fig. 4 is a vertical cross-section on the line 4—4 of Fig. 3, illustrating another method of discharging the stagnant air from the ventilating flues of the tunnel; Fig. 5 is a horizontal sectional plan view through the structure represented by Fig. 3, illustrating a portion of two adjoining tracks; Fig. 6 is a sectional plan view of another embodiment of means for discharging stagnant air from the tunnel and for supplying fresh air thereto by devices independent of the passenger entrances and exits; Fig. 7 is a sectional elevation taken longitudinally through a portion of the tunnel, illustrating the means for supplying fresh air by the suction created by the moving train; Fig. 8 is a vertical cross-section taken in the plane of the dotted line 8—8 of Fig. 6, looking in the direction of the arrow; Fig. 9 is a sectional plan view through another embodiment of the invention, wherein stagnant air is adapted to enter the flue and certain discharge conduits at the top and bottom, respectively, of the tunnel; Fig. 10 is a vertical cross-section through the structure shown by Fig. 9; Fig. 11 is a vertical longitudinal sectional elevation in the plane of the dotted line 11—11 of Fig. 9; Figs. 12 and 13 are views illustrating different means for counterbalancing the movable valves or louvers of the air eduction flues.

A designates a tunnel or an underground subway, the roof, $a$, of which is supported by columns or pillars, arranged in rows, as indicated at C, C', C². On the bed or floor, $a'$, of the tunnel are one or more railway tracks B, on either of which is adapted to travel a car, or a train of cars, indicated at G.

For conveying the vitiated or stagnant air from the tunnel, I provide a plurality of eduction flues or conduits, indicated at D D'. These flues or conduits are, preferably, vertical, and they are placed at suitable intervals. These flues D D' are, or may be, constructed or erected between adjacent columns of a pair, in each row of columns C, C', C², thus utilizing the columns or pillars employed in the construction of the tunnel.

In Fig. 1 of the drawings, I have shown two of the flues, D, D', at every sixth column, but it will be understood that the distance between the flues is not essential and the number of flues can be increased or decreased as may be desired. Each eduction flue is constructed to trap the air entering therein against return to the chamber of the tunnel, and such trapping means may be embodied in various forms of construction, some of which are illustrated in this application in order to disclose various embodiments of my invention.

In the construction of each flue shown by Figs. 1 and 2, the sides of said flue are formed by a plurality of flap valves or louvers, indicated at F, F'. The valves on one side of the flue are pivoted to open inwardly under the pressure of the air which is produced by the movement of the car G on one of the tracks. Said valves or louvers, are adapted to be held in closed positions normally by any suitable means, such as a form of counterpoise. Two forms of this counterpoise are represented by Figs. 12 and 13, either of which, or any equivalent thereof, may be used. It will be observed that the valves F on one side of each eduction flue are adapted to be opened by the pressure of air when a car or train moves in one direction along the second track B, but the valves or louvers F', in the other part of said flue or flues are intended to be opened by the pressure of air which is displaced by the movement of a car or a train adapted to travel on an adjacent, or the first, track B of the plurality of tracks installed in the tunnel.

The flues D D' are shown as communicating at their upper ends with the conduit, E. This conduit is provided at or near the upper ends of the columns C², preferably below the roof $a$. Said conduit runs lengthwise of the tunnel, for a suitable distance and below the arch or roof, and as shown by Fig. 1, it is provided with a discharge branch $e$. The branch of the conduit may lead to any suitable place of discharge exteriorly of the tunnel, as for example through the roof thereof or through the kiosks, which provide an entrance to, and an exit from, the tunnel, for the convenience of passengers in obtaining access to the train, or in leaving the tunnel. It is evident that the branch $e$ of the conduit may be carried to any other place for discharging foul or vitiated air from the tunnel or subway.

I contemplate the employment of eduction flues between any desired row or rows of columns, and in Fig. 2 the eduction flue E' is shown as being provided at the upper ends of the row of columns C. It should be understood, however, that eduction flues, similar to the flues D D' of the columns C², are provided between the columns of the row C, and, furthermore, it is evident that eduction flues and an overhead conduit may be provided in connection with the columns C', without departing from my invention.

In the operation of the ventilating system, the movement of a car or a train, such as G, on one of the tracks, compresses the air in the tunnel, thus creating or establishing a current. The pressure of the vitiated air in advance of the moving car G is utilized for opening the flap valves or louver of the successive eduction flues, as indicated by the arrows in Fig. 1. The air thus compressed will not only open the louvers or valves, but it will readily flow into the flue and thence pass into and through the conduit and also flow into the discharge branch $e$ of said conduit. The air, however, is trapped by the automatic closing of the louvers or valves across the flue, so as to prevent the return of the vitiated air to the chamber of the tunnel.

It will be noted that the movement of the train through the tunnel compresses the air in advance of said train, so as to expel the vitiated air through ducts or flues which are independent of the entrances to, or exits from, the tunnel, thus preventing the passengers when entering or leaving the tunnel from meeting a blast of vitiated air. At the same time, the movement of the train through the tunnel creates a suction in the rear of said train, which suction is sufficient to draw fresh air, through the passenger entrances or exits, into the chamber of the tunnel, but this particular method of drawing fresh air into the tunnel is not relied upon solely for the maintenance of fresh air in the tunnel by drawing it through the passage entrances or exits, because, as will hereinafter appear, the supply of fresh air may be induced, by suction of the moving train, to flow through conduits and flues independently of the exits and entrances.

In the embodiment of the invention shown by Figs. 3 to 5, inclusive of the drawings, the detailed construction of the eduction flue is modified, and provision is made for discharging the vitiated air through the conduits of surface electric, or surface cable, railways.

Instead of employing two series of normally-closed louvers or valves located, respectively, at the sides of each eduction flue, I may employ a single vertical valve or gate on each side of said flue. As shown by Fig. 5, the single valve $F^2$ is hung at one of the vertical edges thereof so as to be opened by the pressure of air which is generated by the movement of a train in one direction, as shown by full lines, but the other valve $F^3$, on the opposite side of the eduction flue, is adapted to be opened by pressure of air in advance of a train traveling in an opposite direction and on an adjacent track, as indicated by dotted lines. The flue, $D^2$, is constructed between adjacent columns of a row of columns, and said flue has communication with an overhead or elevated conduit, $E^2$. From this conduit extend a plurality of branches $e'$, which have communication with a conduit H of a surface railway I, thus making provision for discharging vitiated air by flues into the conduits, and from thence into the street over the tunnel, as shown by Fig. 4.

A further embodiment of the ventilating system is represented by Figs. 6, 7 and 8 of the drawings, wherein the movement of a train through the tunnel serves to not only displace vitiated air therefrom through flues which are independent of the passenger entrances and exits, but such movement of the train also establishes a suction by which fresh air is supplied to the chamber of the tunnel through flues which are also independent of the aforesaid passenger entrances and exits. In Fig. 8, the ventilating system is shown in connection with the tunnel having only two tracks B, and a single row of columns $C^3$, but it will be understood that said system may be extended to apply to tunnels having three, four or more tracks, as may be found necessary or expedient. On one of the tracks is adapted to travel a train, the front and rear cars of which are indicated, respectively, at $G'$ $G^2$, while on the adjacent track is adapted to travel another train, the front car of which is indicated at $G^3$. In this embodiment of the invention, the spaces between the columns of the row $C^3$ are built up to provide a substantially continuous partition, which runs lengthwise of the tunnel and serves to divide the latter into compartments or chambers. Said partition is constructed to form or produce a plurality of eduction flues for the exit of vitiated air, and to also produce a plurality of induction flues for supplying the fresh air, each of said flues being located at intervals. The partition, which extends lengthwise of the tunnel, consists of parts or sections, J, J', arranged between the columns $C^3$, as represented more particularly by Fig. 6, said parts J J' of the said partition being interrupted or broken at suitable intervals to provide the recesses or spaces, $j$, between certain of the columns, in which recesses or spaces the trackmen may stand out of the way of the trains which travel on the tracks, B. The eduction flues $D^3$, $D^4$, are provided on each side of the partition by suitable walls $d$ $d'$. The entrances to the flues $D^4$, on one side of the partition are normally closed by louvers or valves $F^3$, adapted to be opened in one direction by the pressure of air produced by a train $G'$ $G^2$, traveling on one of the tracks, but the entrances to the other flues $D^3$ are normally closed by other louvers or valves $F^4$, adapted to open in another direction by the pressure of air generated by the movement of a train $G^3$ traveling in an opposite direction on the adjacent track, as will be readily understood by reference to Fig. 6. Alternating with the eduction flues $D^3$ $D^4$ are fresh air induction flues K, the same being constructed in the longitudinal division wall or partition wall of the tunnel, each fresh air flue being provided with a valve or gate $k$, which is hung and arranged to be opened by the suction created by the movement of the train, or the last car $G^2$ thereof, whereby the suction induces the flow of fresh air through the flue or flues K into the tunnel back of the train. The valves to the induction flues are, preferably, hung so as to be normally closed and thus prevent the entrance of fresh air into the tunnel except at the time of the passage of a train, the suction from which creates a partial vacuum sufficient to open the valves $k$. By the construction described, I provide a series of air inlets to the tunnel operating successively by the movement of a car or train, for the purpose of replacing the vitiated air, the latter being expelled in advance of the train, through the eduction flues $D^3$ $D^4$.

The eduction flues $D^3$ $D^4$ communicate at their upper ends with horizontal conduits E³, extending preferably close to the roof, on one side of the columns D³, as indicated by Fig. 8; and from these conduits E³ extend suitable branches, by which the foul air may be discharged at any suitable or convenient place or places. With the fresh-air induction-flues K communicates another conduit K', the latter being substantially parallel to the foul-air conduit E³, and this conduit K' is adapted to supply fresh air from a suitable source outside of the tunnel to the fresh-air conduits K, the two conduits E³ and K' being compactly disposed below the arch of the tunnel, preferably quite close to the columns C³.

A further embodiment of the invention is represented by Figs. 9, 10, and 11, wherein provision is made for the exit, by the eduction flue, of vitiated air at the floor, and also at the roof, of the tunnel. The eduction flues D⁵, D⁶, are constructed between the columns C⁵ of one row of columns within the tunnel A, said flues being spaced at proper intervals, as shown by Figs. 9 and 11. Each flue is shown as having a branch D⁷ at its lower end, and another branch D⁸ at its upper end, the branch D⁷ being constructed in the floor or bed, a', while the branch D⁸ is in the roof or arch, a, of said tunnel. The lower branch, D⁷, of each eduction flue opens upwardly through the bed or floor a', and is constructed with one or a plurality of valves F⁶, adapted to be normally closed and to be opened by the pressure of air due to the passing of the train, thus admitting foul air into the branch D⁷, from whence it passes through the flue, and into a suitable discharge conduit, E⁶. The other branch, D⁸, of the eduction flue is constructed in the roof a; it opens into the top part of the tunnel, and, as shown by Fig. 11, this flue D⁸ has one or a plurality of valves F⁷, which are normally closed and are adapted to be opened by the pressure of air for the purpose of admitting the foul air from the top of the tunnel into the branch D⁸, from whence the air flows through the conduit E⁶. As shown by Fig. 9, the bottom branches D⁷ of the adjacent flues D⁵ D⁶ extend in opposite directions, so as to lie below or within the respective parallel tracks B, thus making provision for admitting foul air to the respective flues which are associated with the different tracks of the tunnel.

Under some circumstances it may be desirable to cool the fresh air supplied to the tunnel, or other chamber. It is evident that the fresh air may be cooled by any known form of refrigerating appliances, the latter being so related to the fresh air induction flues as to cool the air before it is discharged into the tunnel.

It is evident to those skilled in the art that many changes in the structure of my apparatus may be made without departing from the spirit of the invention.

It will be understood from the foregoing description that the flue and its automatic valve or louvre constitute a trap wherein air is adapted to be confined. In the case of the eduction trap or valved flue for discharging air, the air is expelled from the tunnel by the piston-like action of a car and is entrapped against return to the tunnel by the trap or flue. The air induction flue or trap, or a plurality of them, however, supplies fresh air to the tunnel on the passage of a car, and such fresh air may be cooled in any desired manner before or at the time of its admission to the tunnel.

Having thus described my invention, what I claim as new and desire to secure by Letters Patent is:—

1. In a ventilating apparatus, a chamber to be ventilated, a foul air exit flue, and air trapping means for establishing communication between the flue and said chamber to be ventilated, the aforesaid air trapping means being operated by the air pressure produced by the movement of a car adapted to operate in said chamber.

2. In a ventilating apparatus, a chamber to be ventilated, a fresh air inlet flue, and an air trapping valve normally cutting off communication between the chamber and the flue, said valve being operated by the suction produced in the chamber incident to the movement of a car or other body adapted to operate in said chamber.

3. In a ventilating apparatus, a tunnel or subway, a foul air eduction flue adapted to communicate therewith, and a normally closed air trapping valve controlling communication between said tunnel and flue, said valve being automatically operated by air pressure produced in the chamber by the movement of a car or other body therein.

4. In a ventilating apparatus, a chamber to be ventilated, a normally closed fresh-air conduit connected therewith, and means operated by an excess of air pressure in the conduit for admitting fresh air to the chamber.

5. In a ventilating apparatus, a chamber to be ventilated, a plurality of foul air eduction-flues extending therefrom, and air trapping means intermediate each eduction flue and the chamber, said air trapping means being operated by the air pressure produced in the chamber by the movement of a car therein, whereby communication is established between the chamber and the successive flues.

6. In a ventilating apparatus, a chamber to be ventilated, a plurality of foul air eduction flues leading therefrom each of which is provided with air-trapping means for cutting off communication with said chamber, and a conduit connected with said flues and open to the outer air, the air trapping means of each flue being operated by the air pressure produced in the chamber by the movement of a car or other body moving therein.

7. In a ventilating apparatus, a chamber to be ventilated, a plurality of flues connected therewith, air trapping means for normally cutting off communication of the flues with the chamber, a conduit connected with each of said flues, and a branch leading from said conduit, the air trapping means being operated by the air pressure produced in the chamber incident to the movement of a car or other body therein.

8. In a ventilating apparatus, a chamber to be ventilated, a plurality of air flues, and air pressure valves in one side of each flue.

9. In a ventilating apparatus, a chamber to be ventilated, an air-flue, and a plurality of valves in two sides of the flue.

10. In a ventilating apparatus, a tunnel or subway, columns therein, air flues at intervals between the columns, and means for establishing communication between the flues and the tunnel on the passage of a moving body.

11. In a ventilating apparatus, a tunnel or subway, eduction and induction air flues at intervals in the tunnel, and means controllable by air pressure produced by a moving body in the tunnel for automatically establishing communication between the flues and the tunnel.

12. In a ventilating apparatus, a chamber to be ventilated, a fresh air intake flue or conduit leading thereto, and air trapping means operated by suction due to the movement of a car or other body in said chamber for establishing communication between said chamber and the flue or conduit, whereby fresh air may be supplied automatically to the chamber.

13. In a ventilating apparatus, a chamber to be ventilated, vertical flues or conduits adapted to communicate with said chamber, and air trapping means in each of said flues or conduits for normally shutting off communication between the chamber and said flues or conduits, which air trapping means is operated by the air pressure produced in said chamber, whereby communication is established between said chamber and the successive flues or conduits.

14. In a ventilating apparatus, a chamber to be ventilated, a series of vertical conduits, a flue connecting with and common to said vertical flues, and an automatic valve in each vertical conduit and adapted to close communication between the chamber and said conduit, said valve being operated by the pressure of air produced by the movement of a car in said chamber.

15. In a ventilating apparatus, a chamber to be ventilated, a plurality of flues or conduits communicating therewith, and a plurality of automatic valves in each flue or conduit, the valves of each flue being operated simultaneously by a body moving in said chamber.

16. In a ventilating apparatus, a chamber to be ventilated, a flue adapted to communicate therewith, an upright conduit, adapted to communicate with the flue, and a plurality of automatic valves in said flue.

17. In a ventilating apparatus, a chamber to be ventilated, a flue or conduit, and automatic valves in a plurality of sides of the flue or conduit, each valve being adapted to be operated by the pressure of air produced by a body moving in said chamber.

18. In a ventilating apparatus, a chamber to be ventilated, a plurality of flues, and a plurality of automatic valves in each of said flues, said valves being adapted to open simultaneously by the displacement of air incident to the movement of a car in the chamber, to permit the outflow of air from the chamber into the flues, and said valves closing by a reduction of air pressure in the chamber for trapping the expelled air against return to the chamber.

19. In a ventilating apparatus, a chamber to be ventilated, vertical flues or conduits spaced one after the other in the chamber, and means adapted to entrap air in each of the flues or conduits against return to the chamber, said air trapping means of one flue being independent of each of the other flues and each air trap being operated by a body moving in the chamber.

20. In a ventilating apparatus, a chamber to be ventilated, an eduction flue or conduit for leading foul air from the chamber, an induction flue or conduit for supplying fresh air to the chamber, and automatic devices operated by a moving body in said chamber for controlling the communication between said chamber and the flues.

21. In a ventilating apparatus, a chamber to be ventilated, a foul air eduction flue leading therefrom, automatic valves controlling communication between said chamber and flue, and a fresh air flue communicating with said chamber.

22. In a ventilating apparatus, a chamber to be ventilated, and an automatic foul air-eduction trap adapted to be put into communication with said chamber by the movement of a car or train in said chamber.

23. In a ventilating apparatus, a chamber to be ventilated, and a plurality of independent automatic air-eduction traps each adapted to be put in communication with said chamber by the movement therein of a car or other body.

24. In a ventilating apparatus, a chamber to be ventilated, and a plurality of vertically-extending air-eduction traps, each trap being independent of the other trap or traps and each being put into communication with said chamber by the movement therein of a car or other body.

25. In a ventilating apparatus, a chamber to be ventilated, an air-eduction trap, and a plurality of fresh air induction traps, said traps being independent of each other and each adapted to be operated by the movement of a car or other body in said chamber.

In testimony whereof I have signed my name to this specification in the presence of two subscribing witnesses.

CHARLES A. MORRIS.

Witnesses:
H. I. BERNHARD,
JAS. H. GRIFFIN.